United States Patent [19]

Garcia et al.

[11] Patent Number: 5,025,068

[45] Date of Patent: Jun. 18, 1991

[54] REACTING NOVOLAC AND BISPHENOL F EPOXY RESINS WITH CARBOXY-TERMINATED BUTADIENE-ACRYLONITRILE

[75] Inventors: Gilbert Garcia, Westchester; Larissa Domnikov, Los Angeles, both of Calif.

[73] Assignee: Hughes Aircraft Company, Los Angeles, Calif.

[21] Appl. No.: 150,002

[22] Filed: Feb. 3, 1988

Related U.S. Application Data

[63] Continuation of Ser. No. 851,632, Apr. 14, 1986, abandoned.

[51] Int. Cl.$^5$ .................. C08G 59/14; C08L 63/10
[52] U.S. Cl. .................. 525/119; 525/113; 525/488; 525/524
[58] Field of Search ............ 525/119, 122, 488, 524

[56] References Cited

U.S. PATENT DOCUMENTS

| | | | |
|---|---|---|---|
| 3,312,754 | 4/1967 | Marks et al. | 525/119 |
| 3,509,086 | 4/1970 | Rohrbacher, Jr. | 525/119 |
| 3,707,583 | 12/1972 | McKown | 525/119 |
| 3,823,107 | 7/1974 | Cotton | 525/119 |
| 3,948,698 | 4/1976 | Elrick et al. | 149/19.6 |
| 4,581,293 | 4/1986 | Saunders | 523/454 |

FOREIGN PATENT DOCUMENTS

| | | | |
|---|---|---|---|
| 0092336 | 10/1983 | European Pat. Off. | |
| 0999383 | 7/1965 | United Kingdom | 525/119 |
| 1276372 | 1/1972 | United Kingdom | |
| 2137627 | 10/1984 | United Kingdom | |

OTHER PUBLICATIONS

Lee and Neville, *Handbook of Epoxy Resins*, McGraw-Hill Book, Co., New York, N.Y., 1982 Reissue, pp. 2–10.

Chemical Abstracts, vol. 105, 1986, (Columbus, Ohio U.S.) see p. 62, abstract 80223z, and JP, A 6,134,015 (Matsushita Electric Works Ltd) Feb. 18, 1986.

*Primary Examiner*—John C. Bleutge
*Assistant Examiner*—Robert E. L. Sellers, II
*Attorney, Agent, or Firm*—Steven M. Mitchell; Robert A. Westerlund; Wanda K. Denson-Low

[57] ABSTRACT

A process for preparing an epoxy resin and a process for preparing a hardened and cured epoxy resin adhesive is provided, together with the epoxy resins and adhesives made thereby. The epoxy resin is prepared by mixing together about 76 parts per hundred of a novolac epoxy resin, about 19 parts per hundred of a bisphenol F epoxy resin, and about 5 parts per hundred of carboxy-terminated butadiene acrylonitrile, heating the mixture to a temperature of from about 290 to about 350 degrees Fahrenheit for a time of from about two to about three hours, and then cooling. An epoxy adhesive is prepared by mixing 100 parts of the material so prepared with about 20 parts of a curing agent consisting essentially of diethyltriamine. The resulting adhesive mixture has a paste-like consistency that is easily applied and cured at ambient temperature. The shear strength of the cured adhesive is about 4000 psi at ambient temperature and about 2000 psi at 250 degrees Fahrenheit. The cured adhesive has excellent peel strength, indicating ductility and toughness. It also exhibits acceptably low levels of particle outgassing, permitting its use in spacecraft applications.

5 Claims, No Drawings

REACTING NOVOLAC AND BISPHENOL F EPOXY RESINS WITH CARBOXY-TERMINATED BUTADIENE-ACRYLONITRILE

This application is a continuation of application Ser. No. 851,632, filed Apr. 14, 1986, now abandoned.

BACKGROUND OF THE INVENTION

The present invention relates to adhesives, and, more particularly, to an epoxy adhesive that is curable at ambient temperature but has high elevated temperature strength.

One of the most important parts of almost all manufacturing operations is the joining of structures that are separately prepared and then joined together into larger pieces, which themselves may be joined to other structures or may be the final assembled parts. Joining of structures is a critical operation, because subsequent failures may occur at the locations where structures are joined, or because there may be special requirements to be met at the interface between two structures. The surface along which two structures are joined must therefore be strong, resistant to failure by many different mechanisms such as fatigue and corrosion, and additionally must sometimes meet other requirements.

Structures used in aircraft and space vehicles are often subjected to some of the greatest demands placed upon any structures, since excellent physical properties must be coupled with low weight. Most structures have, in the past, been joined using mechanical fasteners such as rivets, bolts or screws, or by metallurgical bonding techniques such as welding, brazing or soldering. More recently, the properties of adhesives have improved so that many aerospace structures can be joined by adhesives. Adhesively bonded structures have some important structural advantages over structures bonded with fasteners, since the bonded structures may actually be stronger because the surface loading is distributed over larger areas. Because the loads are distributed, structural failure such as by fatigue cracks initiated at stres concentrations around fasteners is greatly reduced.

Aircraft and spacecraft often experience elevated temperatures during their operating lives, and there has been a continuing effort to develop adhesives having excellent strength at elevated temperatures. It has been found that existing adhesives that achieve excellent elevated temperature strength also require hardening or curing at elevated temperatures. Adhesives which reach their full strength in ambient temperature curing do not have the desired levels of strength at elevated temperature. A further requirement is that the adhesive produce acceptably low levels of particles that escape to the surrounding atmosphere or other environment during and after curing, so that particles are not present to damage or contaminate other parts of the structures or systems.

The inability to achieve excellent elevated temperature strength in an adhesive curable to full strength at ambient temperature makes fabrication of certain structures impossible using adhesive joining techniques. For example, large parts of the structure of a spacecraft may desirably be joined by adhesive bonding. These structures are subjected to elevated temperatures of about 250 degrees Fahrenheit during their operating lives, and therefore the adhesives must have acceptable strength levels at that temperature. The entire structures cannot be placed into an oven for elevated temperature curing of adhesives, since some parts of the spacecraft cannot stand the elevated temperatures. These latter parts may be kept cool during the operating cycle when the other parts are subjected to elevated temperatures, but could not be cooled effectively during a curing operation. Existing adhesives that cure at ambient temperature do not have sufficient strength at the required elevated temperature. Consequently, it has not been possible to utilize adhesive bonding to fabricate such structures, because no adhesive has been known that has the required elevated temperature strength coupled with the ability to develop full strength in ambient temperature curing. The ability to develop elevated temperature strength in an adhesive that cures at ambient temperature is also necessary to making field repairs, where no curing ovens are available.

There exists a need for a curable adhesive that can be cured at ambient temperature, has excellent strength at an elevated temperature of about 250 degrees Fahrenheit, and has low particle outgassing during curing and service. Good ductility and toughness of the adhesive are also important characteristics. The adhesive must also have a paste consistency prior to curing that allows its application to the structures being joined, and be readily applicable to the parts to be bonded. The present invention fulfills this need, and further provides related advantages.

SUMMARY OF THE INVENTION

The present invention resides in a process for preparing an epoxy resin and a process for preparaing a cured adhesive, and the resulting products of the processes. A mixture of the epoxy resin and curing agent may be readily applied to structures and has an acceptable pot life. The applied adhesive cures to full strength at ambient temperature and has a shear strength of about 2000 pounds per square inch (psi) at 250 degrees Fahrenheit. The adhesive is ductile and tough, as determined by peel tests. The adhesive also meets the standards for low particle outgassing in a space environment, so that it can be used for fabricating structures for use in space.

In accordance with the invention, a process for preparing an epoxy resin comprises preparing a mixture consisting essentially of from about 72 to about 79 parts per hundred of a novolac epoxy resin, from about 23 to about 16 parts per hundred of bisphenol F epoxy resin, and from about 3 to about 10 parts per hundred of carboxy-terminated butadiene acrylonitrile, heating the mixture to a temperature of from about 290 to about 350 degrees Fahrenheit for a time sufficient to form a reaction product, ordinarily about two to about three hours, and cooling the reaction product to ambient temperature, the resulting epoxy being curable at ambient temperature but having high elevated temperature strength when cured. The preferred composition contains about 76 parts per hundred of the novolac epoxy resin, about 19 parts per hundred of the bisphenol F epoxy resin, and about 5 parts per hundred of the carboxy-terminated butadiene acrylonitrile. From about 0.1 to about 0.7 parts per hundred, preferably about 0.5 parts per hundred, of a deairing agent may be added to the mixture prior to heating.

A process for preparing a cured epoxy resin comprises preparing a first mixture consisting essentially of from about 72 to about 79 parts per hundred of novolac epoxy resin, from about 23 to about 16 parts per hundred of a bisphenol F epoxy resin, from about 3 to about 10 parts per hundred of carboxy-terminated butadiene acrylonitrile, heating the first mixture to a temperature of from about 290 to about 350 degrees Fahrenheit for a time sufficient to form a reaction product, typically about two to about three hours, cooling the reaction product to ambient temperature to form a curable

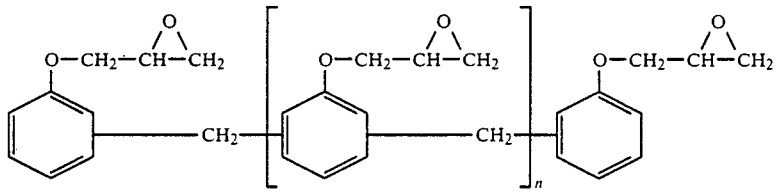

epoxy resin, mixing about 100 parts by weight of the epoxy resin with about 20 parts by weight of a curing agent including an aliphatic tertiary amine, preferably diethyltriamine, and curing the resulting mixture at ambient temperature.

The resulting epoxy adhesive has a paste-like consistency that is easily used in bonding operations, and may be applied to aged surfaces without priming of the surfaces. The adhesive may be cured at ambient temperature to a shear strength of about 4000 psi at ambient temperature and about 2000 psi at 250 degrees Fahrenheit. The adhesive cured at ambient temperature is ductile and tough in peel tests. The epoxy adhesive also has very low particle outgassing during and after curing, so that it may be used to bond structures used in spacecraft. It will therefore be appreciated that the present invention represents an important advance in the art of adhesive bonding, whereby excellent elevated temperature strength is obtained in a low-outgassing adhesive that cures at ambient temperature. Other features and advantages of the present invention will become apparent from the following more detailed description, which illustrates, by way of example, the principles of the invention.

DETAILED DESCRIPTION OF THE PREFERRED EMBODIMENT

The present invention is embodied in an epoxy resin that is prepared by mixing the ingredients and then heating the mixture to a reaction temperature for a sufficient time that the reaction can occur. The mixture is then cooled to yield a viscous mass at ambient temperature, which can then be combined with a curing agent to produce a paste adhesive that has the strength necessary for use in bonding structures. A critical feature is that the epoxy resin adhesive cures to its full strength at ambient temperature but exhibits excellent high temperature strength at a temperature of 250 degrees Fahrenheit. A desirable set of strength objectives, as recognized by many members of the aerospace industry, is an ambient temperature shear strength of about 4000 psi, 180 degree Fahrenheit shear strength of about 3000 psi, and 250 degree Fahrenheit shear strength of about 2000 psi, in an adhesive that cures at ambient temperature and exhibits low particle outgassing. Current adhesives do not have properties even approaching the desired combination of elevated temperature strengths in an ambient-temperature curing material. Some current adhesives do have high strength at ambient temperature but have low elevated temperature strengths.

The epoxy resin of the present invention is prepared by mixing together the ingredients in specific ratios, reacting the ingredients at elevated temperature, and then cooling. One ingredient is from about 72 to about 79 parts per hundred by weight (all ratios in parts per hundred are stated herein on a weight basis, unless indicated otherwise) of a novolac epoxy resin. Novolac epoxy resins are epoxy resins generally of the following structure:

They are prepared by first preparing phenolformaldehyde phenolics called novolacs, and then epoxiding the novolac to form glycidyl ethers of the indicated structure. A variety of novolac epoxy resins are available, with the characteristics of the resin depending upon the starting phenol, the molecular weights, and available phenolic hydroxy groups. The functionality can vary between about 2.5 and 6.0. The preferred novolac epoxy resin, having a functionality of about 3.6, is available from Dow Chemical Co. as D.E.N. 438 epoxy.

If less than about 72 parts per hundred of the novolac epoxy resin is used in the mixture, the resulting cured epoxy has insufficient shear strength when tested at 250 degrees Fahrenheit. If more than about 79 parts per hundred is used, the mixture of epoxy resin and curing agent is too viscous and thick to be properly worked and applied, and is therefore of limited use. The indicated ranges are critical in achieving the desired combination of strength and adhesive workability.

The second ingredient is bisphenol F epoxy resin in an amount of from about 23 to about 16 parts per hundred by weight, the higher end of the range being employed in conjunction with the lower end of the novolac epoxy resin range. Glycidyl ether epoxies based on bisphenol F have a structure as follows:

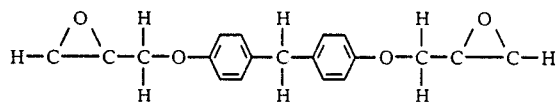

The bisphenol F epoxy resin acts as a diluent to reduce the viscosity of the major component of the epoxy of the invention, the novolac epoxy resin. The final epoxy resin must have a paste-like consistency that has acceptable pot life and working characteristics, and can be readily applied to structures at ambient temperature. If too low a proportion, below about 16 parts per hundred, of the bisphenol F epoxy resin is used in conjunction with too much of the novolac epoxy resin, the resulting adhesive material is too viscous for use as a paste adhesive for application at ambient temperature. Conversely, if too high a proportion, above about 23 parts per hundred, of the bisphenol F epoxy resin is used in conjunction with too low a proportion of the novolac epoxy resin, the resulting adhesive material has insufficient strength at elevated temperature after curing.

The third component of the mixture is carboxy-terminated butadiene acrylonitrile, also termed CTBN, in an amount of from 3 to about 10 parts per hundred of the mixture, by weight. The addition of the CTBN imparts flexibility and toughness to the cured epoxy resin. The use of less than about 3 parts per hundred results in a loss of flexibility, so that the final cured epoxy resin has insufficient flexibility and toughness. The use of more than about 10 parts per hundred of the CTBN results in too much flexibility, so that the high temperature strength of the cured epoxy is unacceptably low. Besides imparting flexibility and toughness to the cured epoxy resin, the CTBN also contributes an extra electron at the epoxy resin surface, thereby increasing the stickiness of the surface, which aids in the application of the paste adhesive to the surfaces to be bonded prior to curing.

The presently most preferred formulation of the epoxy resin is about 76 parts by weight of the novolac epoxy resin, about 19 parts by weight of the bisphenol F epoxy resin, and about 5 parts by weight of carboxy-terminated butadiene acrylonitrile. Additionally, from about 0.1 to about 0.7 parts by weight, preferably about 0.5 parts by weight, of a deairing agent, such as BYK501 manufactured by Mallincrodt Chemical Co., can be added to assist in removing entrapped gasses from the uncured epoxy resin. It is preferred to remove entrapped gasses to reduce the possibility of failure of the cured adhesive because of porosity.

The three components of the epoxy resin, optionally with the deairing agent, are mixed together at ambient temperature and then reacted to produce the epoxy resin in its uncured state. Reaction is accomplished by heating the mixture to a temperature of from about 290 to about 350 degrees Fahrenheit for a time of from about 2 to about 3 hours. If lower temperatures are used, the reaction does not occur, while if higher temperatures are used, the mixture vaporizes during the reaction process. The time of reaction is selected to allow the reaction to proceed to completion, and is adjusted to correspond to the temperature used. A reaction time of about 2½ hours at 325 degrees Fahrenheit is preferred.

The product of the reaction is the epoxy resin in its uncured state. The resin may be packaged and stored indefinitely prior to use.

When the adhesive is to be used, the epoxy resin prepared in the manner described is mixed with a curing agent to form a paste, which is then applied to the surfaces for bonding. The curing agent yielding the best results comprises an aliphatic tertiary amine, most preferably diethyltriamine (DETA). The epoxy resin and DETA curing agent are mixed in a ratio of 100 parts by weight of epoxy resin and 20 parts by weight of DETA. The pot life of a 50 gram batch of the mixture of resin and curing agent is about 30 minutes, and the working time of the adhesive applied to a surface is about 27 minutes.

The bonding procedure is comparable to that used for other paste adhesives. In most instances, both surfaces to be bonded are cleaned and coated with the adhesive. The surfaces are then pressed together until curing is complete. A primer may be used to improve the adhesion of the adhesive to the surfaces, but primers are not necessary in many applications. Curing at ambient temperature requires several days.

The following examples serve to illustrate aspects of the invention, but should not be taken as limiting the invention in any respect.

EXAMPLE 1

An epoxy resin was prepared by mixing together 76 parts by weight of D.E.N. 438 novolac epoxy resin obtained from Dow Chemical Co., 19 parts by weight Epiclon 830 bisphenol F epoxy resin obtained from E.F. Whitmore & Co. (manufactured by Dainippon Ink and Chemical Co.), 5 parts by weight of CTBN 1300/8 carboxy-terminated butadiene acrylonitrile obtained from B.F. Goodrich Co., and 0.5 parts by weight BYK 501 deairing agent obtained from Mallincrodt Chemical Co. This mixture was heated to a temperature of about 325 degrees Fahrenheit. The heating to temperature required about 1 hour, and the mixture was held at temperature for 2½ hours. The mixture was then cooled to ambient temperature, forming the uncured epoxy resin. The uncured epoxy resin was mixed with EC-4 aliphatic tertiary amine curing agent obtained from Monomer, Polymer and Dayjac Co., in the ratio of 100 parts epoxy resin to 20 parts curing agent, by weight. The resulting adhesive was a paste of proper viscosity and consistency to be applied to vertical and horizontal surfaces to be bonded, without undue runoff or dripping in the time required to place the bonded surfaces into contact.

EXAMPLE 2

The adhesive of Example 1 was allowed to cure for 7 days at ambient temperature. Its specific gravity upon curing was 1.18, and its viscosity at 25 degrees centigrade was 3,000,000 cps. Its particle outgassing characteristics, determined in accordance with ASTM standard E595, were 1.18% TML (total mass loss), 0.01% CVCM (condensible volatile collectable material), and 0.34% WVR (water vapor residue).

EXAMPLE 3

The tensile lap shear strength and peel strength of the adhesive were measured. Tensile lap shear strength was determined in accordance with ASTM standard D1002 and Mil. Spec. MMM-A-132, for specimens of unprimed aluminum alloy bonded with adhesive prepared as described in Example 1, and cured at ambient temperature for 7 days. The peel strength was determined in accordance with ASTM standard D3167.

The average lap shear strength at ambient temperature, averaged over 105 specimens, was 4200 psi, with a standard deviation of 450 psi. The average lap shear strength at 180 degrees Fahrenheit, averaged over 40 specimens, was 2700 psi, with a standard deviation of 250 psi. The average lap shear strength at 250 degrees Fahrenheit, averaged over 72 specimens, was 1900 psi, with a standard deviation of 180 psi.

Peel strengths of the adhesives were also measured. These peel strengths are important indicators of ductility and toughness of the adhesive. Low peel strengths are caused by low ductility of the adhesive, and low ductility can result in failure of the bonded structure, as for example by fatigue failure, even if the adhesive is otherwise strong. The average T-peel strength of the present adhesive at ambient temperature was 14 pounds per inch width, averaged over 20 specimens. The average 90 degree peel strength was 20 pounds per inch width, averaged over 15 specimens. By contrast, many current adhesives have peel strengths of only a few pounds.

EXAMPLE 4

It is often observed that prepared metal surfaces such as aluminum alloys must be bonded immediately upon cleaning, to avoid the formation of oxides that impair bonding. Aerospace manufacturing procedures for currently used adhesives typically call for bonding to be accomplished within 24 hours of cleaning, which requires careful coordination of cleaning and bonding operations. To determine whether this is the case for surfaces bonded with the adhesive of the present invention, aluminum alloy test specimens were prepared, allowed to age for various numbers of days, and then bonded. 2024T aluminum alloy coupons were etched in a hot mixture of 55 parts by weight of sulfuric acid, 10 parts by weight of sodium dichromate, and 80 parts by weight of water, and then aged at ambient temperature in air for various numbers of days. Pairs of coupons were then bonded with the epoxy resin adhesive prepared as described in Example 1 and cured for 7 days at ambient temperature. The coupons were not primed before bonding. The results of lap shear tests performed at ambient temperature in accordance with ASTM standard D1002 are as follows:

| Days Aging | No. of Specimens | Bond Strength, psi | Standard Deviation, psi |
|---|---|---|---|
| 1 | 10 | 5116 | 182 |
| 14 | 10 | 4839 | 432 |
| 21 | 10 | 5106 | 283 |
| 28 | 15 | 5068 | 330 |
| 65 | 5 | 4858 | 547 |
| 365 | 10 | 4116 | 1038 |

There is little, if any, effect of the aging of the coupons before bonding on the bond strength, except for the very longest aging period. The relative insensitivity of the bond strength to aging of the surfaces to be bonded allows greater flexibility in scheduling of manufacturing operations, an important advantage in production of bonded parts.

From the examples, it is seen that the strength of the paste adhesive prepared in accordance with the invention, and cured at ambient temperature, substantially meets the objectives of 4000 psi ambient temperature shear strength and 2000 psi 250 degree Fahrenheit shear strength. This combination of properties represents an important advance in the art of adhesive bonding. The adhesive can be applied as a paste, often without priming the surfaces to be bonded, and cured at ambient temperature, so that the entire structure need not be heated to achieve curing. This feature is important in assembling a complex spacecraft, where some of the already assembled components may not be capable of heating to normal elevated curing temperatures. Also, the paste adhesive can be applied in the field, where there would be no furnace to heat the structure to an elevated curing temperature. The bonded structures have excellent strength after curing, with ambient temperature shear strength of about 4000 psi and 250 degree Fahrenheit shear strength approaching 2000 psi. This combination of strength properties in an epoxy resin adhesive curable at ambient temperatures has not been previously achieved. Peel tests demonstrate that the cured adhesive is ductile and tough, and thereby resistant to other failure modes such as fatigue. Moreover, the adhesive can be used in spacecraft applications because of its low particle outgassing characteristics.

Although a particular embodiment of the invention has been described in detail for purposes of illustration, various modifications may be made without departing from the spirit and scope of the invention. Accordingly, the invention is not to be limited except as by the appended claims.

What is claimed is:

1. A process for preparing an epoxy resin, comprising:
    preparing a mixture consisting essentially of from about 72 to about 79 parts per hundred of a novolac epoxy resin having a functionality from about 2.5 to 6.0, from about 23 to about 16 parts per hundred of bisphenol F epoxy resin having a functionality of 2, and from about 3 to about 10 parts per hundred of carboxy-terminated butadiene acrylonitrile;
    heating the mixture to a temperature of from about 290 to about 350 degrees Fahrenheit for a time sufficient to form a reaction product; and
    cooling the reaction product to ambient temperature, whereby the resulting epoxy is curable at ambient temperature but has high elevated temperature strength when cured.

2. The process of claim 1, wherein said mixture consists essentially of about 76 parts per hundred of the novolac epoxy resin, about 19 parts per hundred of the bisphenol F epoxy resin, and about 5 parts per hundred of the carboxy-terminated butadiene acrylonitrile.

3. The process of claim 1, wherein the mixture is heated for a time of about two to about three hours in said step of heating.

4. An epoxy resin prepared by the process of claim 1.

5. The process of claim 1, wherein the functionality of the novolac epoxy resin is about 3.6.

* * * * *